United States Patent
Liu

(10) Patent No.: US 9,901,118 B2
(45) Date of Patent: Feb. 27, 2018

(54) ELECTRONIC CIGARETTE

(71) Applicant: KIMREE HI-TECH INC., Tortola (VG)

(72) Inventor: Qiuming Liu, Shenzhen (CN)

(73) Assignee: Huizhou Kimree Technology Co. Ltd. Shenzhen Branch, Guangdong (CN)

(*) Notice: Subject to any disclaimer, the term of this patent is extended or adjusted under 35 U.S.C. 154(b) by 0 days.

(21) Appl. No.: 14/367,286

(22) PCT Filed: Feb. 20, 2014

(86) PCT No.: PCT/CN2014/072314
§ 371 (c)(1),
(2) Date: Aug. 20, 2015

(87) PCT Pub. No.: WO2015/120637
PCT Pub. Date: Aug. 20, 2015

(65) Prior Publication Data
US 2016/0338406 A1    Nov. 24, 2016

(30) Foreign Application Priority Data

Feb. 12, 2014  (CN) .................... 2014 2 0063683 U

(51) Int. Cl.
*A24F 13/00*    (2006.01)
*A24F 17/00*    (2006.01)
(Continued)

(52) U.S. Cl.
CPC ............. *A24F 47/008* (2013.01); *H01R 4/28* (2013.01); *H01R 13/17* (2013.01); *F16B 7/182* (2013.01);
(Continued)

(58) Field of Classification Search
CPC .................................................. A24F 47/008
(Continued)

(56) References Cited

U.S. PATENT DOCUMENTS

| | | | |
|---|---|---|---|
| 2008/0092912 A1* | 4/2008 | Robinson | A24F 47/008 131/200 |
| 2011/0036346 A1* | 2/2011 | Cohen | A61M 15/0065 128/200.14 |

(Continued)

FOREIGN PATENT DOCUMENTS

| | | |
|---|---|---|
| CN | 202445137 U | 9/2012 |
| CN | 202900920 U | 4/2013 |

(Continued)

OTHER PUBLICATIONS

International Search Report dated Nov. 18, 2014 for corresponding PCT Application No. PCT/CN2014/072314, 8 pages.
(Continued)

*Primary Examiner* — Abdullah Riyami
*Assistant Examiner* — Thang Nguyen
(74) *Attorney, Agent, or Firm* — Ohlandt, Greeley, Ruggiero & Perle, LLP

(57) ABSTRACT

The present application provides an electronic cigarette. The electronic cigarette includes: a body of the electronic cigarette, a suction end, a liquid storage, an atomizing assembly, and a battery rod assembly. The liquid storage is arranged on the body of the electronic cigarette at an end away from the suction end; the atomizing assembly is disposed between the battery rod assembly and the liquid storage, and two ends of the atomizing assembly are respectively provided with a first connection section and a second connection section which have different connecting structures; the atomizing assembly is connected to the battery rod assembly via the first connection section, and the atomizing assembly is connected to the liquid storage via the second connection section. When the electronic cigarette subjected an external screwing force along one direction, only one of the battery rod assembly and the liquid storage can be screwed out.

9 Claims, 7 Drawing Sheets

(51) Int. Cl.
*A24F 25/00* (2006.01)
*A24F 47/00* (2006.01)
*H01R 4/28* (2006.01)
*H01R 13/17* (2006.01)
*F16B 7/18* (2006.01)
*H01R 24/00* (2011.01)
*H01R 24/38* (2011.01)
*F16B 7/20* (2006.01)

(52) U.S. Cl.
CPC ............. *F16B 7/20* (2013.01); *H01R 24/005* (2013.01); *H01R 24/38* (2013.01)

(58) Field of Classification Search
USPC .................................................. 131/329, 328
See application file for complete search history.

(56) References Cited

U.S. PATENT DOCUMENTS

| | | | | |
|---|---|---|---|---|
| 2012/0260926 | A1* | 10/2012 | Tu | A24F 47/008 131/329 |
| 2013/0284192 | A1* | 10/2013 | Peleg | A24F 47/002 131/329 |
| 2014/0332021 | A1* | 11/2014 | Li | A24F 47/008 131/329 |
| 2014/0366896 | A1* | 12/2014 | Li | A24F 47/008 131/329 |
| 2015/0150307 | A1* | 6/2015 | Liu | H05B 1/0244 131/329 |
| 2015/0173124 | A1* | 6/2015 | Qiu | A24F 47/008 131/328 |
| 2016/0295918 | A1* | 10/2016 | Liu | A24F 47/008 |
| 2017/0000190 | A1* | 1/2017 | Wu | H05B 3/44 |
| 2017/0127724 | A1* | 5/2017 | Liu | A24F 47/008 |
| 2017/0143917 | A1* | 5/2017 | Cohen | A61M 15/0066 |

FOREIGN PATENT DOCUMENTS

| | | |
|---|---|---|
| CN | 203072893 U | 7/2013 |
| CN | 203087526 U | 7/2013 |
| CN | 203353686 U | 12/2013 |
| CN | 203353690 U | 12/2013 |
| CN | 203378559 U | 1/2014 |
| CN | 203378563 U | 1/2014 |
| CN | 203388269 U | 1/2014 |
| CN | 203388270 U | 1/2014 |
| CN | 203416808 U | 2/2014 |

OTHER PUBLICATIONS

International Written Opinion dated Nov. 18, 2014 for corresponding PCT Application No. PCT/CN2014/072314, 4 pages.

* cited by examiner

ELECTRONIC CIGARETTE

CROSS REFERENCE TO RELATED APPLICATION

This application claims the benefit of priority to Chinese Patent Application No. 201420063683.0, entitled "ELECTRONIC CIGARETTE", filed on Feb. 12, 2014 with State Intellectual Property Office of PRC, which is incorporated herein by reference in its entirety.

TECHNICAL FIELD

The present application relates to the technical field of electronic cigarettes, and particularly to an electronic cigarette which can prevent false operation.

BACKGROUND

A conventional electronic cigarette includes an atomizing assembly, a liquid storage and a battery rod assembly. The liquid storage device and the battery rod assembly are respectively disposed at two ends of the atomizing assembly and are detachably connected to the atomizing assembly through threads. The threads at two ends of the atomizing assembly are in the same turning direction.

Since the atomizing assembly is connected to both the liquid storage and the battery rod assembly through threads and the threads at two ends of the atomizing assembly are in the same turning direction, when it is intended to take out the battery rod assembly for charging, a user often holds the liquid storage with one hand, and rotates the battery rod assembly with the other hand. Here, if the liquid storage device is not connected tightly enough with the atomizing assembly and the atomizing assembly is tightly connected with the battery rod assembly, it may happen that that even the liquid storage has been unscrewed from the atomizing assembly, the battery rod assembly has not yet been unscrewed and taken out. Similarly, when the liquid storage is to be replaced, it may happen that that the liquid storage device has not yet been unscrewed, while the battery rod assembly has already been unscrewed.

SUMMARY

In view of this, the present application provides an electronic cigarette which can prevent false operation.

An electronic cigarette includes:
a body of the electronic cigarette; wherein
the body of the electronic cigarette includes a suction end, a liquid storage for storing liquid, an atomizing assembly for atomizing the liquid and a battery rod assembly for supplying power to the atomizing assembly;
the liquid storage is arranged on the body of the electronic cigarette at an end away from the suction end;
the atomizing assembly is disposed between the battery rod assembly and the liquid storage, a first connection section and a second connection section are provided at two ends of the atomizing assembly, respectively, and the first connection section and the second connection section have different connecting structures; and
the atomizing assembly is connected to the battery rod assembly via the first connection section, and the atomizing assembly is connected to the liquid storage via the second connection section.
According to the electronic cigarette,
the second connection section is a first threaded segment;
an opening end of the liquid storage is provided with first matching threads adapted to be in thread connection with the first threaded segment;
the first connection section is a first fastener;
an end of the battery rod assembly connecting with the atomizing assembly is provided with a first clamping groove at a position corresponding to that of the first fastener, the first fastener is adapted to be clamped in the first clamping groove.
According to the electronic cigarette,
the first connection section is a second threaded segment;
an end of the battery rod assembly connecting with the atomizing assembly is provided with second matching threads adapted to be in thread connection with the second threaded segment;
the second connection section is a third fastener;
the opening end of the liquid storage is provided with a third clamping groove at a position corresponding to that of the third fastener, the third fastener is adapted to be clamped in the third clamping groove;
or,
the second connection section is a fourth clamping groove;
the opening end of the liquid storage is provided with a fourth fastener at a position corresponding to that of the fourth clamping groove, the fourth fastener is adapted to be clamped in the fourth clamping groove.
According to the electronic cigarette,
an end of the battery rod assembly connecting with the atomizing assembly is provided with a first butt groove;
a side wall of the first butt groove is provided with a first guide groove extending along a radial direction of the battery rod assembly for guiding the first fastener;
the first clamping groove is arranged on the side wall of the first butt groove and disposed at two sides of the first guide groove and the first guide groove and the first clamping groove are communicated with each other According to the electronic cigarette, the first fastener is an elastic fastener.

According to the electronic cigarette, the atomizing assembly includes an inner electrode, an outer electrode sleeved on the inner electrode and a heating wire electrically connected to each of the inner electrode and the outer electrode for atomizing the liquid;
an elastic element is sleeved in the outer electrode;
the first fastener is arranged on the elastic element and passes through the outer electrode to reach an outer surface of the atomizing assembly.

According to the electronic cigarette, the elastic element is a metal elastic strip or an annular metal wire.

According to the electronic cigarette, a magnetic element for attracting the fastener is arranged on the side wall of the first clamping groove.

According to the electronic cigarette, an elastic limiting element for limiting a position of the fastener is arranged on the first clamping groove.

According to the electronic cigarette, a position limiting groove for receiving the fastener is provided in a central portion of the elastic limiting element.

According to the electronic cigarette, the suction end is disposed outside an end of the battery rod assembly connecting with the atomizing assembly or the suction end is disposed in a central portion of the battery rod assembly, or the suction end is disposed on the battery rod assembly at a position away from the atomizing assembly.

According to the electronic cigarette, the atomizing assembly and the battery rod assembly are coaxially arranged.

The electronic cigarette according to the present application includes: a body of the electronic cigarette. An atomizing assembly is disposed between a battery rod assembly and a liquid storage, and two ends of the atomizing assembly are respectively provided with a first connection section and a second connection section which have different connecting structures. The atomizing assembly is connected to the battery rod assembly via the first connection section, and the atomizing assembly is connected to the liquid storage via the second connection section. The first connection section and the second connection section disposed at two ends of the atomizing assembly according to the present application have different structures, such that when the electronic cigarette subjected an external screwing force along one direction, only one of the battery rod assembly and the liquid storage can be screwed out, thus effectively preventing false operation.

BRIEF DESCRIPTION OF THE DRAWINGS

For more clearly illustrating embodiments of the present application or the technical solution in the existing technology, drawings used in the description of the embodiments or the existing technology will be briefly described hereinafter. Apparently, the drawings in the following description are only several embodiments of the present application, and for the person skilled in the art other drawings may be obtained based on these drawings without any creative efforts.

DETAILED DESCRIPTION

Figure 1:
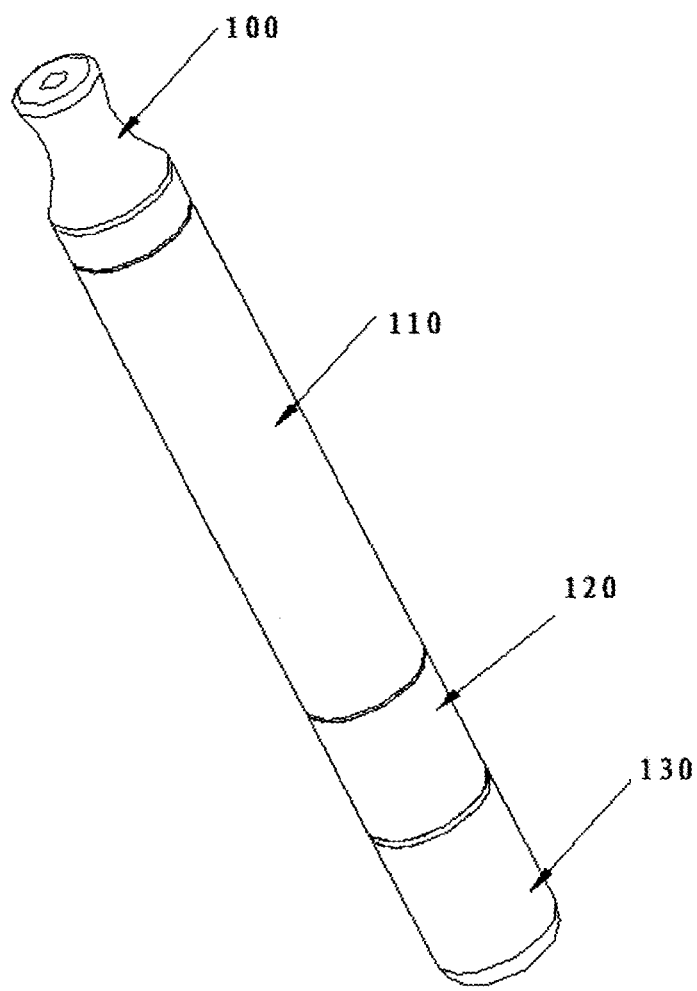
FIG. 1 is an overall structural diagram of an electronic cigarette according to a preferred embodiment of the present application.

The present application provides an electronic cigarette. The overall structure of the electronic cigarette is shown in FIG. 1. Referring to FIG. 1, the electronic cigarette includes a body of the electronic cigarette.

The body of the electronic cigarette is provided with a suction end 100, through which the user may smoke.

The liquid storage 130 is configured to store liquid. Specifically, atomizable liquid is stored in the liquid storage 130.

The atomizing assembly 120 is configured to atomize the liquid. The liquid in the liquid storage 130 may be atomized via the atomizing assembly 120.

The atomizing assembly 120 is disposed between the battery rod assembly 110 and the liquid storage 130, thus allowing the appearance of the electronic cigarette to realistically imitate that of a cigarette.

A fume passage (not shown in the Figures) for the flow of atomized liquid is formed in the body of the electronic cigarette, so as to allow the user to suck the liquid flowing through the fume passage via the suction end 100.

The body of the electronic cigarette further includes a battery rod assembly 110 for supplying power to the atomizing assembly 120.

As illustrated in FIG. 1, the liquid storage 130 is arranged on the body of the electronic cigarette at an end away from the suction end 100. Such an arrangement is advantageous in that since the liquid storage is arranged away from the suction end 100, the fume passage disposed in the body of the electronic cigarette does not pass through the liquid storage 130, such that the un-atomized liquid in the liquid storage 130 may not be leaked into the fume passage, and the user may not suck the un-atomized liquid, which effectively avoids the leakage of the liquid. Besides, the fume passage, which does not pass through the liquid storage 130, may avoid the condensation of the fume in the fume passage, and therefore effectively prevents the blockage of the fume passage by the condensed liquid.

Furthermore, two ends of the atomizing assembly 120 are respectively provided with a first connection section and a second connection section having different connecting structures.

The atomizing assembly 120 is connected to the battery rod assembly 110 through the first connection section, and the atomizing assembly is connected to the liquid storage 130 through the second connection section.

Also, the atomizing assembly 120 of the electronic cigarette is disposed between the battery rod assembly 110 and the liquid storage 130.

Preferably, by means of the first and the second connection section, the liquid storage 130 is detachably connected to the atomizing assembly 120 and the atomizing assembly 120 is detachably connected to the battery rod assembly 110.

Adopting the detachable connection is advantageous in that it facilitates the user to replace the atomizing assembly 120 or/and detach the liquid storage 130 at any time, thereby facilitating the user to add liquid into the liquid storage 130 or replace the liquid storage 130.

Further, since the connecting structures of the first connection section and the second connection section are different, the force for detaching the battery rod assembly 110 by the user is applied in a direction different from that for detaching the liquid storage 130. In other words, when a force is applied on the electronic cigarette in one direction, only one of the battery rod assembly 110 or the liquid storage 130 can be detached from the atomizing assembly 120, and if the other one is intended to be detached, the user needs to apply a screwing force to the electronic cigarette in another direction, thus avoiding false operation in the detaching and effectively improving the efficiency of the detaching by the user.

In the present embodiment, the conventional false operation would not occur during the detaching of the electronic cigarette by virtue of the first connection section and the second connection section having different connecting structures, thus improving the efficiency in usage.

The overall structure of the electronic cigarette will be further described in detail hereinafter by continuing to make reference to FIG. 1.

The atomizing assembly 120 is disposed between the battery rod assembly 110 and the liquid storage 130, and the suction end 100 is disposed outside an end of the battery rod assembly 110, or the suction end 100 is disposed in a central portion of the battery rod assembly 110, or the suction end 100 is disposed on the battery rod assembly 110 at a position away from the atomizing assembly 120.

Specifically, the suction end 100 disposed outside an end of the battery rod assembly 110 may be disposed coaxially with the battery rod assembly 110. With such an arrangement, the appearance of the electronic cigarette realistically imitates a real cigarette, and the whole fume passage is substantially straight, thus effectively reducing liquid accumulation.

Alternatively, the suction end 100 is arranged in a central portion of the battery rod assembly 110 or disposed on the battery rod assembly 110 at a position away from the atomizing assembly 120.

In the present application, the specific position of the suction end 100 is not limited.

In the present embodiment, in order to allow the overall structure of the electronic cigarette to imitate a real cigarette to be in conformity with the habit of the user and reduce liquid accumulation, the atomizing assembly 120 and the battery rod assembly 110 are coaxially arranged.

Of course, the specific arrangement is not limited in this embodiment. For example the sequentially connected battery rod assembly 110, the atomizing assembly 120 and the liquid storage 130 may be arranged to be staggered such that the electronic cigarette may have an irregular overall appearance in any shape.

The atomizing assembly 120 and the battery rod assembly 110 may also be non-coaxially arranged, i.e., the liquid storage 130 and the atomizing assembly 120 are juxtaposed, such that the liquid storage 130 and the atomizing assembly 120 are respectively connected to the battery rod assembly 110, and thus the overall structure of the electronic cigarette is in an T shape.

In this embodiment, the overall structure of the integral electronic cigarette is not limited, so long as the liquid storage 130 is arranged at a position away from the suction end 100.

In this embodiment, the atomizing assembly 120 is disposed between the battery rod assembly 110 and the liquid storage 130, i.e., the atomizing assembly 120 is disposed away from the suction end 100, and when the user smokes with the electronic cigarette according to this embodiment, since the position of the atomizing assembly 120 is away from the position of the mouth, the user would not be burnt by the heat generated in the atomizing assembly 120 for atomizing the liquid, which effectively improves the safety of using the electronic cigarette. Also, during smoking, the user generally grips the battery rod assembly 110, rather than griping the hot atomizing assembly 120 as in the existing technology, such that when the user smokes with the electronic cigarette according to this embodiment, the hand of the user will not be burned, thereby effectively imitating the temperature of the real cigarette, and improving the user experience during smoke.

More preferably, the atomizing assembly 120 of the electronic cigarette according to this embodiment is detachably connected to the battery rod assembly 110 and the liquid storage 130 respectively via the first connection section and the second connection section having different connecting structures.

Such a detachable connection is advantageous in that, it facilitates the user to replace the atomizing assembly 120 or detach the liquid storage 130 at any time, thereby facilitating the user to add the liquid into the liquid storage 130 or replace the liquid storage 130. Of course, the liquid storage 130 may be non-detachably connected to the atomizing assembly 120 and/or the atomizing assembly 120 may be non-detachably connected to the battery rod assembly 110, the disclosure is not limited in this aspect.

The atomizing assembly 120 in the electronic cigarette may be detachably connected to the battery rod assembly 110 and the liquid storage 130 respectively via the first connection section and the second connection section having different connecting structures in the following way.

A first way for connection is described in detail hereinafter in conjunction with FIG. 2.

Figure 2:
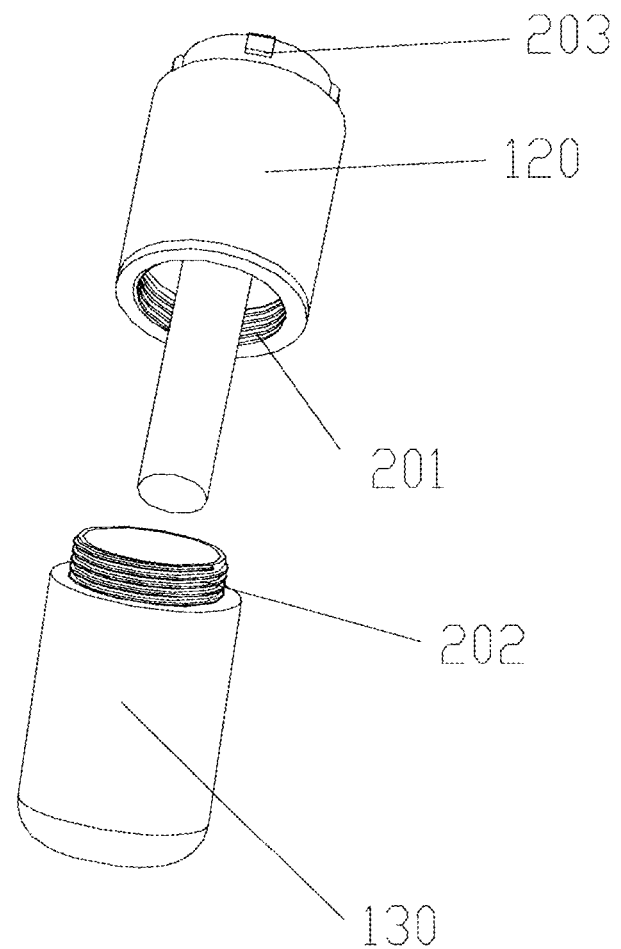
FIG. 2 is a partial exploded view of an electronic cigarette according to another preferred embodiment of the present application.

As shown in FIG. 2, the second connection section 201 is a first threaded segment.

An opening end of the liquid storage 130 is provided with first matching threads 202 adapted to be in thread connection with the first threaded segment.

The atomizing assembly 120 is connected to the liquid storage 130 through threads via the threaded cooperation between the first threaded segment and the first matching threads 202.

The first connection section 203 is a first fastener.

The specific structure by which the battery rod assembly 110 is connected to the atomizing assembly 120 is described in detail hereinafter in conjunction with FIG. 3.

Figure 3:
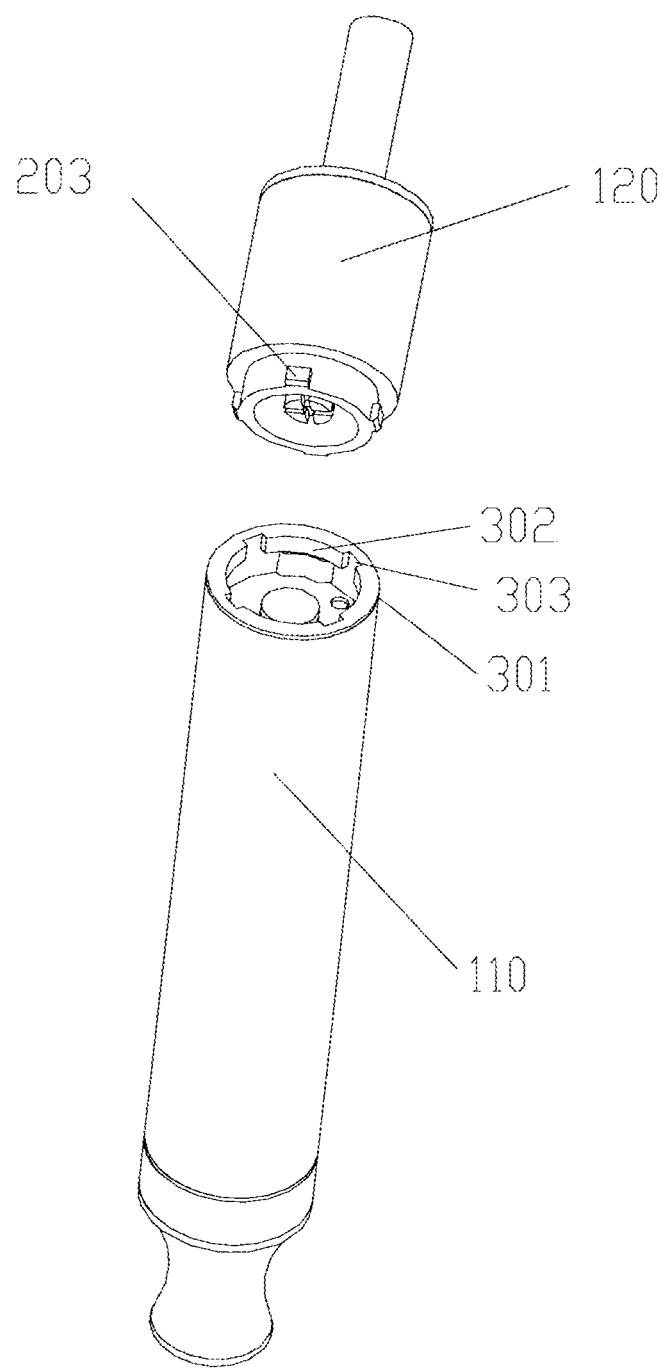
FIG. 3 is a partial exploded view of an electronic cigarette according to another preferred embodiment of the present application.

As illustrated in FIG. 3, an end of the battery rod assembly 110 connecting with the atomizing assembly 120 is provided with a first butt groove 301.

A side wall of the first butt groove 301 is provided with a first guide groove 302 extending along a radial direction of the battery rod assembly for guiding the first fastener, and the first fastener is slidable in the first guide groove 302 via the first guide groove 302.

A first clamping groove 303 is arranged on the side wall of the first butt groove 301 and disposed at two sides of the first guide groove 302.

The first clamping groove 303 and the first guide groove 302 are communicated with each other, the position at which the first clamping groove 303 is arranged corresponds to that of the first fastener 203, and the first fastener 203 is adapted to be clamped in the first clamping groove 303, so as to allow the atomizing assembly 120 and the battery rod assembly 110 to be connected by clamping.

In this way of connection, since the atomizing assembly 120 is connected to the liquid storage 130 through threads while the atomizing assembly 120 and the battery rod assembly 110 are connected by clamping, it requires the user to rotate the liquid storage 130 if the liquid storage 130 is to be detached, and during the rotating, the battery rod assembly 110 connected by clamping would not be mis-detached. In other words, the forces applied by the user to the electronic cigarette for detaching the battery rod assembly 110 and the liquid storage 130 are different, thus effectively avoiding false operation during the detaching.

A second way of connection is as follows.

The second connection section 201 is a first threaded segment.

The opening end of the liquid storage 130 is provided with first matching threads 202 adapted to be in thread connection with the first threaded segment.

The atomizing assembly 120 is connected to the liquid storage 130 through threads via the threaded cooperation between the first threaded segment and the first matching threads 202.

More preferably, the first fastener is an elastic fastener.

In this way, the elastic first fastener is enabled to be clamped into the clamping groove smoothly, so as to achieve the clamping between the atomizing assembly 120 and the battery rod assembly 110 or between the atomizing assembly 120 and the liquid storage 130.

Figure 4:
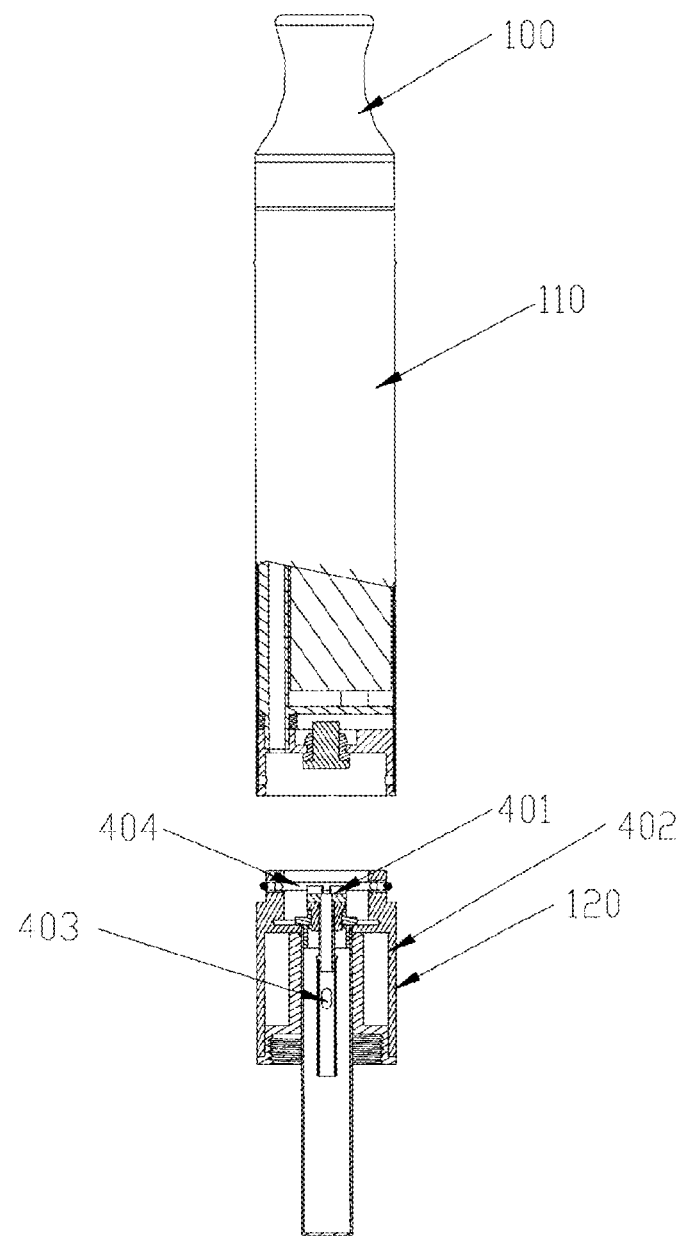
FIG. 4 is a partial exploded view of an electronic cigarette according to another preferred embodiment of the present application.

The structure of the atomizing assembly of the electronic cigarette is described hereinafter in conjunction with FIG. 4. As shown in FIG. 4, the atomizing assembly 120 includes:

an inner electrode 401; and an outer electrode 402 sleeved on the inner electrode 401 and a heating wire 403 electrically connected to each of the inner electrode 401 and the outer electrode 402 for atomizing the liquid.

An elastic element 404 is sleeved in the outer electrode 402.

The first fastener is arranged on the elastic element 404 and passes through the outer electrode 402 to reach an outer surface of the atomizing assembly.

The elastic element 404 may be a metal elastic strip or an annular metal wire.

Figure 5:
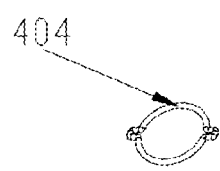
FIG. 5 is a schematic diagram showing the structure of an elastic element of an annular metal wire in an electronic cigarette according to another preferred embodiment of the present application.

Reference may be made to FIG. 5 for the specific structure of the elastic element 404 being the annular metal wire.

The atomizing assembly 120 and the battery rod assembly 110 are connected by the clamping of the first fastener on the elastic element 404, such that the elasticity of the first fastener is well maintained during the connection, therefore enabling the detaching and assembling by the user to be more smoothly, and the connection between the atomizing assembly 120 and the battery rod assembly 110 to be more stable.

For further stable clamping between the clamping groove and the fastener, a magnetic element for attracting the fastener may be arranged on the side wall of the first clamping groove.

The fastener is closely clamped into the clamping groove due to the magnetic attracting member disposed inside the clamping groove, which enables the stable connection between the atomizing assembly 120 and the battery rod assembly 110, or enables the stable connection between the atomizing assembly 120 and the liquid storage 130.

Furthermore, for preventing the fastener clamped into the clamping groove from being shifted, for example, being shifted rightwards or leftwards, an elastic limiting element for limiting a position of the fastener may be arranged on the first clamping groove.

Figure 6:
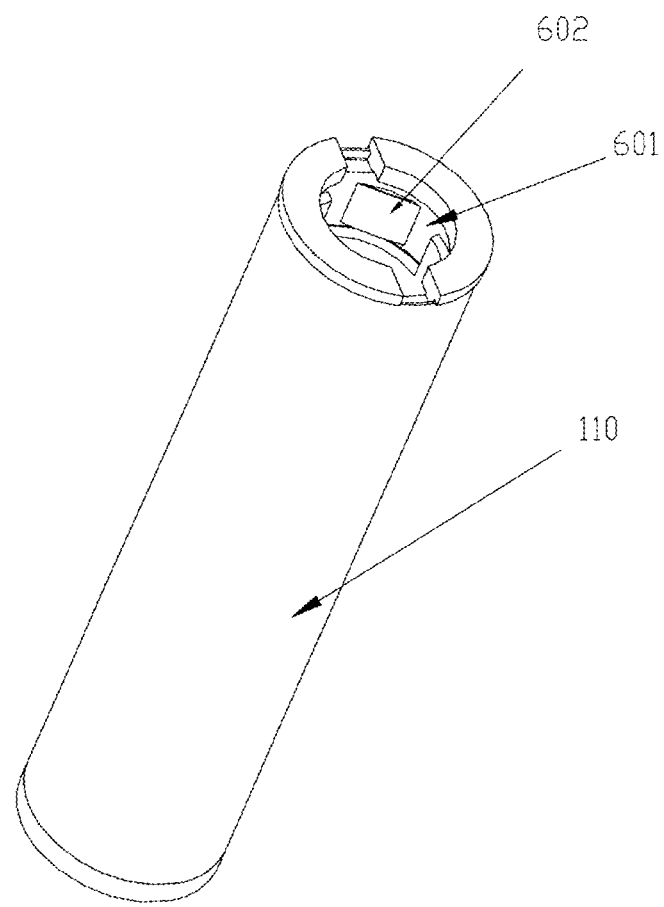
FIG. 6 is a schematic diagram showing the structure of a battery rod assembly in an electronic cigarette according to another preferred embodiment of the present application.

Referring to FIG. 6, taking the first clamping groove arranged on an end of the battery rod assembly 110 as an example, an elastic limiting element 602 for limiting the position of the fastener is arranged on the first clamping groove 601 disposed on an end of the battery rod assembly 110.

Due to the function of the elastic limiting element 602, the first fastener clamped into the first clamping groove 601 would not wag rightwards and leftwards.

It is to be appreciated that, the elastic limiting element 602 is not only arranged in the first clamping groove at an end of the battery rod assembly 110.

Preferably, the elastic limiting element 602 is arranged on one side of the first clamping groove.

More preferably, a central portion of the elastic limiting element 602 is provided with a position-limiting groove for receiving the fastener. The wag of the fastener clamped into the clamping groove may be further prevented by the position-limiting groove, thus improving the stability of connection between various assemblies of the electronic cigarette.

The structure of the liquid storage of the electronic cigarette is described with reference to FIG. 7. Specifically, the liquid storage 130 shown in FIG. 7 may include: a sealed chamber 701 arranged inside the liquid storage 130, with liquid stored in the sealed chamber 701 in a sealed manner.

In order that the amount of the liquid remained in the liquid storage 130 is knowable to the user, the liquid storage 130 is a transparent container, i.e., the user may know the amount of the liquid remained in the electronic cigarette at any time via the transparent liquid storage 130, which facilitates the timely replacement of the liquid storage 130 by the user.

Preferably, the liquid storage 130 is a glass bottle. The property of the glass material is relatively stable, thus avoiding influence to the scent of the liquid due to chemical reactions or the like.

Preferably, an outer circumferential wall of the liquid storage 130 made of glass is provided with scales, thus enabling the user to estimate the time span before the depletion of the remained liquid and facilitate the using by the user.

Preferably, a protective cartridge (not shown in the Figures) is sleeved on the liquid storage 130, so as to prevent the liquid storage 130 of glass material from being broken due to falling off.

Preferably, the protective cartridge is provided with a liquid observing window, for the user to observe the liquid.

For imitating the cigarette, the length of the electronic cigarette is generally equivalent to that of a cigarette, and for reducing the frequency of being charged so as to increase the service life of the battery rod assembly 110, the length of the battery rod assembly 110 may at least take up over half of the entire length of the electronic cigarette. When a user smokes with the electronic cigarette in this embodiment, he or she may naturally grip the electronic cigarette at upper-middle portion of the electronic cigarette close to the suction end 100. Since the liquid storage 130 in this embodiment is arranged at an end away from the suction end 100, it is avoided that the liquid storage 130 is subjected to a griping force applied by the user, thus allowing the amount of the liquid output by the liquid storage 130 to the atomizing assembly 120 to be more uniform, and effectively ensuring the stability of the fume and improving the user experience. It is avoided that the liquid is output unevenly due to the varying force applied at the end of the atomizing assembly, which may result in uneven amount of fumes.

For effectively ensuring the liquid storage 130 to have good sealing performance so as to avoid the leakage of the liquid effectively, two arrangements are adopted in this embodiment.

Referring to FIG. 4, in the first arrangement, for enabling the liquid storage 130 connected to the atomizing assembly 120 to have good sealing performance and for ensuring the liquid in the liquid storage 130 not to leak, a sealing ring for sealing the liquid storage 130 is provided at the joint between an atomizer holder 405 and the liquid storage 130.

The sealing performance of the liquid storage 130 may be effectively ensured via the sealing ring arranged on the atomizer holder 405.

Figure 7:
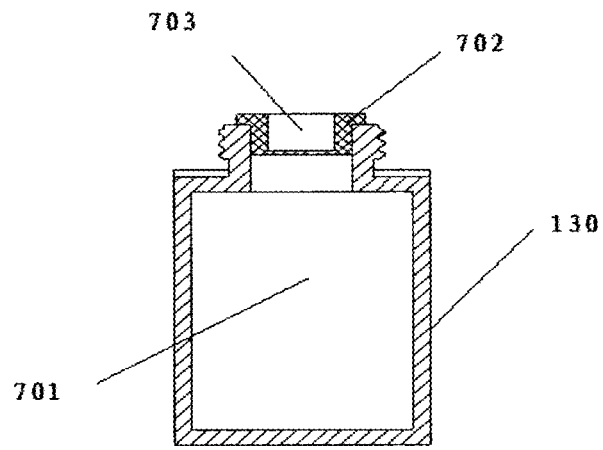
FIG. 7 is a schematic diagram showing the structure of a liquid storage in an electronic cigarette according to another preferred embodiment of the present application.

Referring to FIG. 7, in the second arrangement, an annular sealing plug 702 with a through hole is sealedly provided at the mouth of the liquid storage 130.

A piercable film 703 for sealing the liquid storage 130 is arranged inside the through hole of the annular sealing plug 702.

When the atomizing assembly 120 is connected to the liquid storage 130, the liquid storage 130 may still have good sealing performance via the piercable film 703, thus effectively preventing the liquid from leaking.

Since the liquid storage 130 according to this embodiment is provided with an annular sealing plug 702 having the pierable film 703, the liquid storage 130 has good sealing performance, which effectively prevents the liquid from leaking, prolongs the service time of the electronic cigarette and ensures the service life of the electronic cigarette.

Preferably, a sealing ring for sealing may be further provided at the joint between the atomizing assembly 120 and the battery rod assembly 110, via which the sealing performance of the battery rod assembly 110 may be ensured, thus ensuring the concentration of the atomized liquid, and ensuring the using experience.

To facilitate the transmission of the liquid from the liquid storage 130 to the atomizing assembly 120, another structure of the electronic cigarette is described in detail hereinafter in conjunction with the embodiment shown in FIG. 8.

Figure 8:
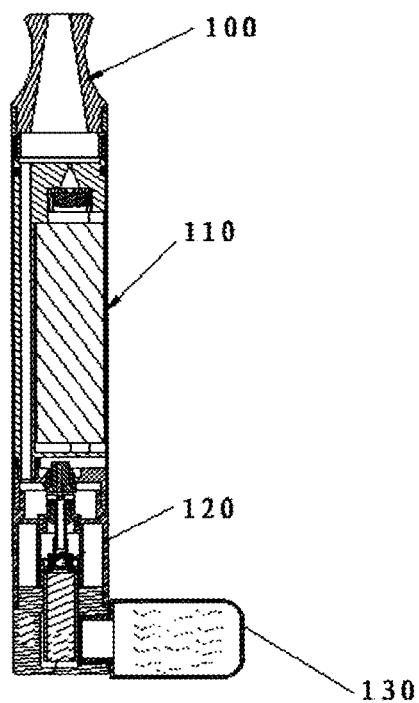
FIG. 8 is a schematic sectional view of an electronic cigarette according to another preferred embodiment of the present application.

As shown in FIG. 8, the electronic cigarette includes a suction end 100 and a battery rod assembly 110. For the structure of the suction end 100 and the battery rod assembly 110, reference may be made to the description in the above embodiments, and description of which is omitted in this embodiment.

In this embodiment, liquid storage 130 for storing the liquid is arranged on an outer circumferential wall of the atomizing assembly 120, and the atomizing assembly is connected to the liquid storage via the second connection section. For the structure of the second connection section, reference may be made to the above embodiments, and the description of which is omitted here.

In this embodiment, the flowing direction of the liquid inside the liquid storage 130 is perpendicular to or at a certain angle with respect to that of the liquid transferred from the atomizing assembly 120 to the heating wire 403 to be atomized, so as to avoid over-supply of the liquid to the atomizer due to reasons such as shaking, enable the liquid to be transferred to the atomizing assembly 120 evenly, and ensure the even amount of the fume. Furthermore, with such a structure, the liquid storage 130 of glass material may be prevented from being broken due to the impact when the electronic cigarette falls off with an end landed on the ground.

It is to be appreciated that, the number and specific position of the liquid storage 130 arranged on the side wall of the atomizing assembly 120 in this embodiment are not limited.

Figure 9:
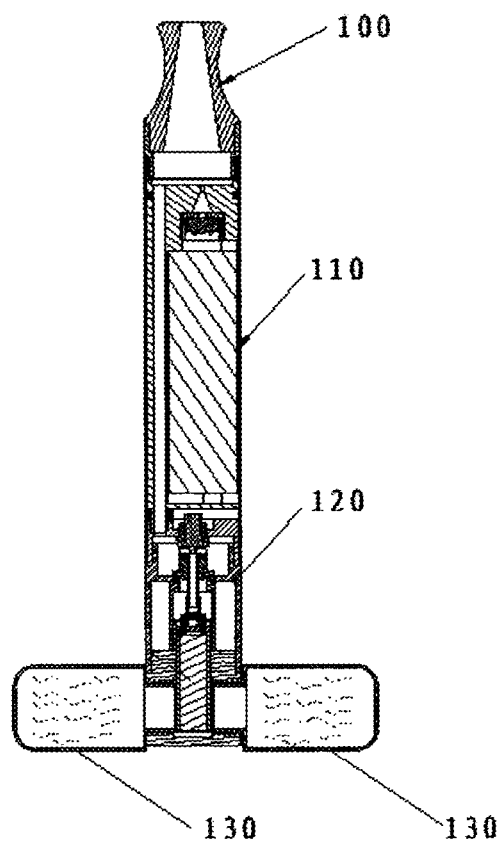
FIG. 9 is a schematic sectional view of an electronic cigarette according to another preferred embodiment of the present application.

For example, as shown in FIG. 8, when there is one liquid storage 130 arranged on the side wall of the atomizing assembly 120, the body of the electronic cigarette is in an L shape;

Or as shown in FIG. 9, when there are two liquid storages 130 arranged on the side wall of the atomizing assembly 120 to be opposite to each other, the body of the electronic cigarette is in a T shape.

The technical solutions in the embodiments of the present application will be described clearly and completely hereinafter in conjunction with the drawings. Apparently, the described embodiments are only a few of the embodiments of the present application, rather than all embodiments. Based on the embodiments in the present application, any other embodiments, made by the person skilled in the art without any creative efforts, fall into the protection scope of the present application.

The embodiments of the present invention are described herein in a progressive manner, each of which emphasizes the differences from others; hence for the same or similar parts between the embodiments, one can refer to the other embodiments.

The above description of the disclosed embodiments enables those skilled in the art to implement or use the invention. Numerous modifications to the embodiments will be apparent to those skilled in the art, and the general principle herein can be implemented in other embodiments without departing from the spirit or scope of the invention. Therefore, the present invention shall not be limited to the embodiments described herein, but shall cover the widest scope consistent with the principle and novelty features disclosed herein.

The invention claimed is:

1. An electronic cigarette, comprising:
a body of the electronic cigarette; wherein
the body of the electronic cigarette includes a suction end, a liquid storage for storing liquid, an atomizing assembly for atomizing the liquid and a battery rod assembly for supplying power to the atomizing assembly;
the liquid storage is arranged on the body of the electronic cigarette at an end away from the suction end;
the atomizing assembly is disposed between the battery rod assembly and the liquid storage, a first connection section and a second connection section are provided at two ends of the atomizing assembly, respectively, and the first connection section and the second connection section have different connecting structures; and
the atomizing assembly is connected to the battery rod assembly via the first connection section, and the atomizing assembly is connected to the liquid storage via the second connection section,
wherein the second connection section is a first threaded segment;
an opening end of the liquid storage is provided with first matching threads adapted to be in thread connection with the first threaded segment;
the first connection section is a first fastener; and
an end of the battery rod assembly connecting with the atomizing assembly is provided with a first clamping groove at a position corresponding to that of the first fastener, and the first fastener is adapted to be clamped in the first clamping groove,
wherein the atomizing assembly comprises an inner electrode, an outer electrode sleeved on the inner electrode and a heating wire electrically connected to each of the inner electrode and the outer electrode for atomizing the liquid;
an elastic element is sleeved in the outer electrode;
the first fastener is arranged on the elastic element and passes through the outer electrode to reach an outer surface of the atomizing assembly.

2. The electronic cigarette according to claim 1, wherein the end of the battery rod assembly connecting with the atomizing assembly is provided with a first butt groove;
a side wall of the first butt groove is provided with a first guide groove extending along a radial direction of the battery rod assembly for guiding the first fastener;
the first clamping groove is arranged on the side wall of the first butt groove and is disposed at two sides of the first guide groove, and the first guide groove and the first clamping groove are communicated with each other.

3. The electronic cigarette according to claim 2, wherein the first fastener is elastic fastener.

4. The electronic cigarette according to claim 2, wherein a magnetic element for attracting the fastener is arranged on a side wall of the first clamping groove.

5. The electronic cigarette according to claim 2, wherein an elastic limiting element for limiting a position of the fastener is arranged on the first clamping groove.

6. The electronic cigarette according to claim 5, wherein a position limiting groove for receiving the fastener is provided in a central portion of the elastic limiting element.

7. The electronic cigarette according to claim 1, wherein the elastic element is a metal elastic strip or an annular metal wire.

8. The electronic cigarette according to claim 1, wherein the suction end is disposed outside an end of the battery rod assembly connecting with the atomizing assembly or the suction end is disposed in a central portion of the battery rod assembly, or the suction end is disposed on the battery rod assembly at a position away from the atomizing assembly.

9. The electronic cigarette according to claim 1, wherein the atomizing assembly and the battery rod assembly are coaxially arranged.

* * * * *